(12) United States Patent
Williams et al.

(10) Patent No.: US 10,140,216 B2
(45) Date of Patent: Nov. 27, 2018

(54) MEASURING ADDRESS TRANSLATION LATENCY

(71) Applicant: ARM LIMITED, Cambridge (GB)

(72) Inventors: Michael John Williams, Ely (GB); Michael Filippo, Driftwood, TX (US); Hazim Shafi, Austin, TX (US)

(73) Assignee: ARM LIMITED, Cambridge (GB)

( * ) Notice: Subject to any disclaimer, the term of this patent is extended or adjusted under 35 U.S.C. 154(b) by 54 days.

(21) Appl. No.: 15/002,648

(22) Filed: Jan. 21, 2016

(65) Prior Publication Data

US 2017/0212844 A1    Jul. 27, 2017

(51) Int. Cl.
*G06F 12/10* (2016.01)
*G06F 12/1027* (2016.01)
*G06F 3/06* (2006.01)
*G06F 12/1009* (2016.01)
*G06F 11/34* (2006.01)

(52) U.S. Cl.
CPC ........ *G06F 12/1027* (2013.01); *G06F 3/0611* (2013.01); *G06F 3/0653* (2013.01); *G06F 3/0673* (2013.01); *G06F 11/3409* (2013.01); *G06F 11/3466* (2013.01); *G06F 12/1009* (2013.01); *G06F 2212/1024* (2013.01); *G06F 2212/68* (2013.01)

(58) Field of Classification Search
CPC ............. G06F 12/1027; G06F 12/1009; G06F 3/0611; G06F 3/0653; G06F 3/0673; G06F 2212/1024; G06F 2212/68; G06F 12/10; G06F 3/06
USPC .................................................. 711/207, 202
See application file for complete search history.

(56) References Cited

U.S. PATENT DOCUMENTS

| | | | |
|---|---|---|---|
| 6,195,748 B1 | 2/2001 | Chrysos et al. | |
| 9,213,649 B2 * | 12/2015 | Koka | G06F 12/1009 |
| 2007/0283125 A1 * | 12/2007 | Manczak | G06F 11/3466 711/207 |
| 2012/0054466 A1 | 3/2012 | Devendran et al. | |
| 2014/0089572 A1 * | 3/2014 | Koka | G06F 12/1009 711/105 |
| 2015/0081983 A1 * | 3/2015 | Ries | G06F 12/0862 711/137 |
| 2015/0095610 A1 | 4/2015 | Ben-Meir | |
| 2015/0178220 A1 * | 6/2015 | Grubisic | G06F 12/1027 711/202 |

OTHER PUBLICATIONS

International Search Report and Written Opinion of the International Searching Authority dated Nov. 7, 2016 in PCT/GB2016/051667, 11 pages.
Dean et al., "*ProfileMe*: Hardware Support for Instruction-Level Profiling on Out-of-Order Processors", Digital Equipment Corporation, IEEE, Published in the Proceedings of Micro-30, Dec. 1-3, 1997, 12 pages.

* cited by examiner

*Primary Examiner* — Pierre Miche Bataille
(74) *Attorney, Agent, or Firm* — Nixon & Vanderhye PC

(57) ABSTRACT

An apparatus includes processing circuitry to process instructions, some of which may require addresses to be translated. The apparatus also includes address translation circuitry to translate addresses in response to instruction processed by the processing circuitry. Furthermore, the apparatus also includes translation latency measuring circuitry to measure a latency of at least part of an address translation process performed by the address translation circuitry in response to a given instruction.

22 Claims, 7 Drawing Sheets

MEASURING ADDRESS TRANSLATION LATENCY

BACKGROUND

Technical Field

The present technique relates to the field of data processing.

Technical Background

A data processing apparatus may process instructions. Some apparatuses may include mechanisms for measuring the performance of the processing apparatus when processing those instructions.

SUMMARY

At least some examples provide an apparatus comprising:
processing circuitry to process instructions;
address translation circuitry to translate addresses in response to instructions processed by the processing circuitry; and
translation latency measuring circuitry to measure a latency of at least part of an address translation process performed by the address translation circuitry in response to a given instruction.

At least some examples provide an apparatus comprising:
means for processing instructions;
means for translating addresses in response to the instructions processed by the means for processing; and
means for measuring a latency of at least part of an address translation process performed by the means for translating in response to a given instruction.

At least some examples provide a method comprising:
processing instructions;
translating addresses in response to the instructions processed; and
measuring a latency of at least part of an address translation process performed in response to a given instruction.

Further aspects, features and advantages of the present technique will be apparent from the following description of examples, which is to be read in conjunction with the accompanying drawings.

DESCRIPTION OF EXAMPLES

Figure 1:
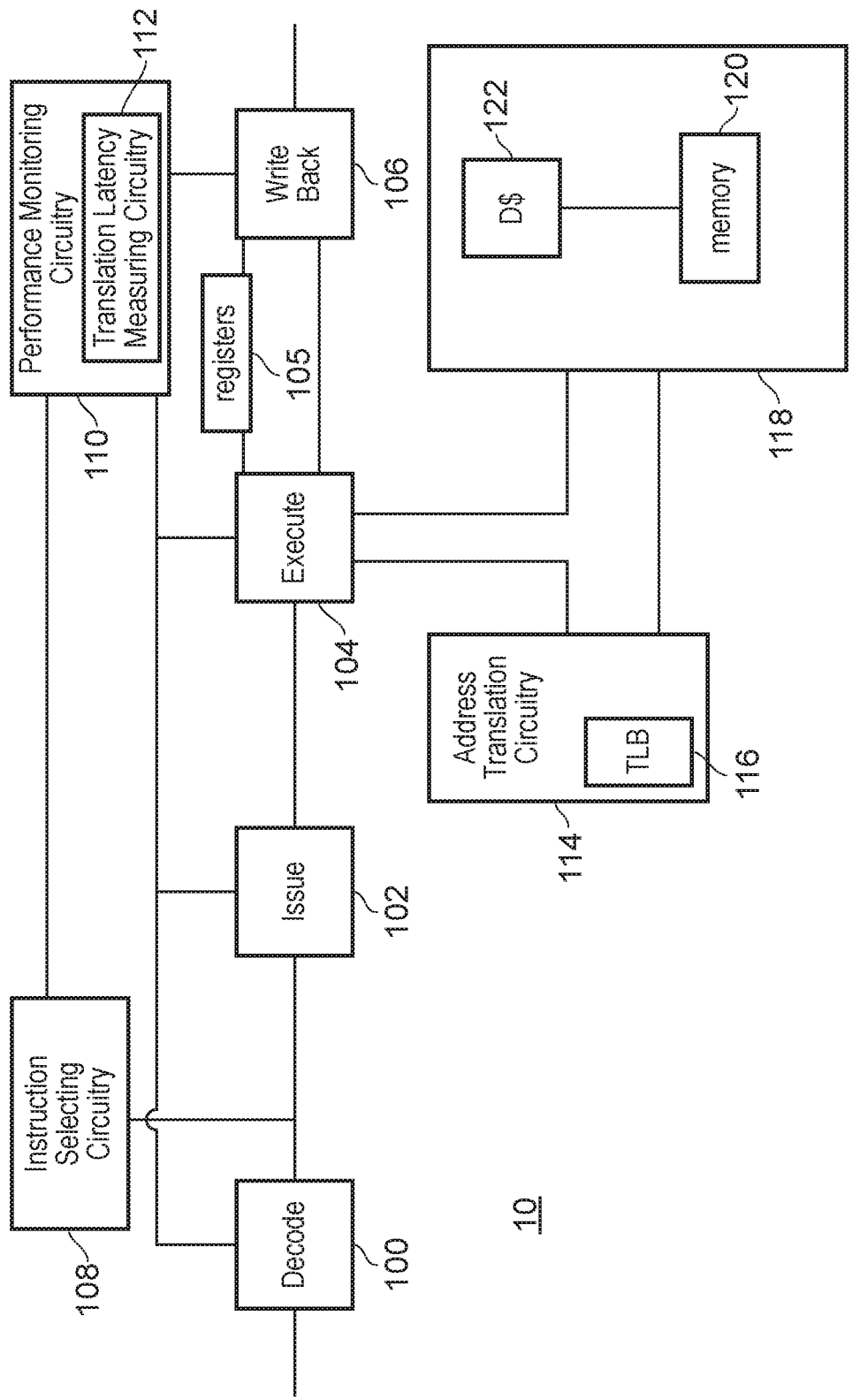
FIG. 1 schematically illustrates one example of a processing pipeline.

Some specific examples will be discussed below. It will be appreciated that the invention is not limited to these particular examples.

A data processing apparatus may have mechanisms for monitoring performance when processing instructions. Some data processing apparatuses may include address translation circuitry to translate addresses in response to instructions, and the latency associated with performing the address translation may be one factor which affects the overall performance when processing some instructions.

One approach for identifying performance issues caused by address translation may be to count the occurrences of specific events such as a miss in a translation lookaside buffer (TLB) or a request for page table data to be fetched from a memory. This approach assumes that if there are a lot of TLB misses or page table walks, then performance may be poor compared to when there are fewer TLB misses or page table walks.

However, the inventors recognised that in some systems the time taken to perform address translations can vary to a relatively large extent between instructions which all experience the same kind of event such as a TLB miss. The apparatus according to the present technique includes translation latency measuring circuitry to measure a latency of at least part of an address translation process. The latency provides a more direct indication of how long a translation takes, so a more accurate determination of the cost to performance can be made. It is still possible to count events such as TLB misses or page table walks in addition to measuring the address translation latency.

There may be a number of reasons why the latency associated with address translations may vary even among instructions which all experience the same kind of event (e.g. TLB miss). There may be a variety of caching strategies for locally caching some information used for address translation (e.g. page table entries could be cached in a data cache, or walk caches could be used to cache the address of a page table entry in memory to speed up page table walks), so the latency may depend on where the required information is cached.

In some examples, the address translation circuitry may translate a virtual address to a physical address using a two stage translation, including a first stage to obtain an intermediate address from a virtual address, and a second stage to obtain a physical address from the intermediate address. This can be useful for example to support virtualisation where the first stage is controlled by an operating system and the second stage is controlled by a hypervisor. When two stages of address translation are used, the present technique can be particularly advantageous because a two stage translation introduces more variables by which the latency of address translations can vary, and so the direct measurement of translation latency may be more useful than a mere count of the number of TLB misses or page table walks.

The measured address translation latency could be a measure of the latency associated with the whole of the address translation process for obtaining a physical address from a given virtual address. When the address translation process includes a first translation stage and a second translation stage, the latency measurement could be the total latency of both stages.

Alternatively, the measured latency could be of just part of the address translation process, or multiple separate measurements of latency could be made for several parts of the process. For example, a latency measurement can be taken exclusively for one of the translation stages, or the latency of both stages could be measured separately to allow more targeted identification of which stage is causing potential performance issues.

The address translation process may sometimes obtain translation data by performing a page table walk using page tables in a data store (e.g. memory). For example, the page table walk could be performed if there is a miss in a TLB. In some cases the page table may be a single-level page table where a single access to memory returns the translation data for translating a given virtual address.

However, in some cases the page tables may have a hierarchical structure. In this case, a single page table walk may include a number of accesses to different levels of page tables. For example, a given level of page table may be looked up to identify a pointer to the next level of page table and several levels of page table may be traversed to locate the final level of page table including the required translation data. Such a hierarchical structure can be useful for reducing the overall size of the page table structure in memory. When a multilevel page table structure is provided, there can be increased variation in latency associated with page table walks as depending on caching strategies being used some of the steps of the walk may be faster than others or may be omitted altogether. Therefore, in a system providing a hierarchical page table structure, it can be particularly useful to monitor performance by tracking address translation latency rather than merely counting events.

The apparatus can also include instruction selecting circuitry to select a subset of instructions to be monitored by the translation measuring circuitry, and the translation latency measuring circuitry may measure a latency of the address translation when one of the subset of instructions requires the address translation process. On the other hand, when an instruction that is not from the subset of instructions requires an address translation, the translation latency measuring circuitry may not measure the address translation latency for that instruction. This helps to reduce the area and power overhead associated with the translation latency measuring circuitry by not tracking all instructions. Sampling a specific subset of instructions as candidates for address translation can also help to attribute latency measurements to individual instructions, which can provide more targeted diagnostic information than approaches which merely count how many events occur during execution of the program as a whole. Although one might expect that recording the latency for only a subset of instructions could miss certain performance-critical events, sampling a certain fraction of the instructions can give enough information to provide a statistically representative view of the performance of the program as a whole.

The instruction selecting circuitry may identify which instructions are part of the subset to be monitored in different ways. For example, a tag value associated with the instruction itself may be used to indicate whether an instruction belongs to the subset or not. The tag may pass down a processing pipeline along with the instruction, and when the translation latency measuring circuitry detects an instruction having a tag with a set value, then the translation latency measuring circuitry may measure the address translation latency for that instruction. Another option may to use an identifier that is stored separately to the subset of instructions to identify the subset. For example, each instruction may already have an instruction identifier distinguishing it from other instructions, and the instruction selecting circuitry may store a record separate from the instructions themselves identifying which instruction identifiers belong to the subset, and when the translation latency measuring circuitry encounters an instruction whose identifier is stored in the record, it may measure the latency. Another option may be to use a combination of these approaches, e.g. a separately stored identifier for an instruction group which includes the subset of instructions, and tags associated with specific instructions within that group that are to be used as the subset of instructions; or a tag associated with all instructions of an instruction group passed down the pipeline, and one or more separate identifiers specifying which instructions of the tagged group are to be included in the subset. It would also be possible to use different approaches for different parts of the micro-architecture, e.g. some families of instructions may use tags and others may use identifiers. Also, in some cases an instruction could be tagged for part or parts of its lifetime, and referenced by a record for other parts. For example, the instruction could be tagged when in a pipeline, but a record of the instruction's identifier could be used when the instruction is in a queue (e.g. a load/store queue).

The maximum number of the subset of instructions permitted to be in flight in a pipeline at a given time may vary from implementation to implementation. Some systems may provide enough resource to track the address translation latency for multiple instructions simultaneously, in which case more than one in-flight instruction could be identified as belonging to the subset of instructions at a given time. However, to reduce circuit overhead, other systems may restrict the number of monitored instructions to one in-flight instruction at a time.

The instruction selecting circuitry may be configured to select an additional instruction as one of the subset of instructions after a predetermined interval has elapsed since selecting the previous instruction. If the interval is long enough, this could effectively limit the number of in-flight instructions monitored to one at a time. The interval could be set by software or could be hardwired. Furthermore, a delay can be included between elapse of the interval and selection of another instruction—it is not essential to select the immediately following instruction after the interval expires. For example, after the predetermined interval has elapsed, the instruction selecting circuitry could count for a randomly determined further interval before selecting the next member of the subset. Randomly varying the interval by which instructions are selected to be included in the subset can provide better statistical sampling as the chance of a sampling interval coinciding with a program loop is reduced. The predetermined interval could be defined in terms of a number of processing cycles, or a number of instructions encountered.

In some examples, when the predetermined interval has elapsed, the instruction selecting circuitry may defer selecting another instruction as one of the subset until the previously selected instruction has progressed beyond a predetermined processing stage. This predetermined stage could be the point at which any address translations required by the previous instruction have been completed, or the predetermined stage could be a later processing stage such as a writeback or retire stage of a pipeline. In this way, even if software for example sets the sampling interval to a relatively short time, the translation latency measuring circuitry can measure the address translation latency corresponding to a single instruction at a time, to avoid the need to provide additional circuitry (e.g. counters) for tracking multiple instructions.

The apparatus may include performance monitoring circuitry to monitor other items of information corresponding to the subset of instructions. The other items of information can be used in conjunction with the address translation latency to determine performance metrics of the subset of instructions. Hence, the address translation latency may not be the only information being monitored and may form part of a bigger picture of issues that may affect the performance of individual instructions.

The translation latency may in general be measured as a latency between a start event and an end event. In some cases, which particular events are used as the start/end events could be configurable, e.g. by setting information in configuration registers using software. Alternatively, some systems may have circuitry which is hardwired to be triggered by a certain type of start event or end event, so that it is not possible for a user to vary which event triggers the start and end of the latency measurement.

In one example, the translation latency measuring circuitry may detect the start event in response to a request for an address translation being received by the address translation circuitry for a given instruction. Alternatively, the start event may be detected in response to the given instruction being issued to a functional circuit unit configured to issue requests for address translation. Even if the address translation process itself does not begin for some time after the instruction is issued to the relevant functional circuit unit, if the delay between the instruction arriving at the functional circuit unit and the address translation request being issued is substantially constant for each instruction then starting the address translation latency measurement slightly earlier still allows the relative address translation delay associated with different instructions to be determined (it is not necessary to provide an absolute measurement of address translation latency). In some cases, it may be more efficient in hardware to detect an instruction being received at a given functional circuit unit than to detect the actual address translation request.

The end event may be detected in response to a translated address being returned by the address translation circuitry. Alternatively, the end event may be detected in response to a data access request specifying a translation address obtained by the address translation circuitry being issued to a data store. Again, although the time between returning the translated address and issuing the data access request may not be part of the address translation process itself, if it is relatively constant for each instruction then stopping the address translation measurement at the time of the data access request being issued may merely add a fixed offset to each measurement. Hence, there is scope for some flexibility in exactly when the latency measurement starts and ends to allow more efficient circuit implementation in some cases.

Any combination of these start events and end events could be used for a given latency measurement. Also, the start/end events could relate to the start and end of an individual stage of address translation in the case where there are multiple stages of translation.

Also, in some cases even when a given start or end event has been detected, there may be a certain delay before the latency measurement actually starts or stops. For example, to avoid delays to the actual processing of the sampled instruction (which affects the critical path), the latency measurement could start or stop after some action is taken in relation to the instruction processing itself. For example, the address translation request could be issued before starting latency measurement, or the data access request could be sent to memory before stopping latency measurement.

There are different ways of recording the latency. The apparatus may include a counter to start counting in response to the start event and to stop counting in response to the end event, the count value at the time of the end event corresponding to the latency of the address translation. Alternatively, a time-stamper may record a timestamp at the start event, and another timestamp at the end event, and the latency may be calculated on the basis of the difference between the timestamps. When timestamping is used, the recorded value(s) representing the address translation latency may be the start/end timestamps themselves or the difference between the timestamps.

The translation latency measuring circuitry may be configured to write the measured latency to a storage location. The storage location may include a performance monitoring buffer, which can store other data collected from monitoring the given instruction as well as the address translation latency. In some cases, when the buffer becomes full, software may be signalled to process the contents of the buffer so that the buffer can be overwritten with other performance data.

The storage location could also be a region of memory allocated for storing performance monitoring data. The measured latency (and optionally other performance monitoring information) could be written to the storage location after every instruction or periodically after a given number of instructions have been monitored or after a certain amount of monitoring data has been obtained (the certain amount of data could be data for multiple instructions or a subset of data relating to one instruction). For example, when a local buffer provided on-chip becomes full, the data could be written out to memory. Data from the buffer can also be written to memory in response to other kinds of event (not just the buffer becoming full)—e.g. when an instruction completes the corresponding data could be written to memory.

For example, the other information recorded for a given instruction may include: an address of the given instruction, a context identifier identifying a context (e.g. process or virtual machine) associated with the given instruction, an instruction type of the given instruction, an address to be translated in response to the given instruction, a translated address obtained in response to the given instruction, a total latency associated with processing of the given instruction, an indication of whether an address request for the given instruction hits in a translation lookaside buffer, or an indication of whether a data request for the given instruction hits in a data cache.

In some cases, some filtering could be applied for determining whether the data monitored for a given instruction should be written to the storage location. This filtering could be specific to the address translation latency measurement, or could affect all the data monitored for a given instruction. The filtering could be based on various parameters, e.g. the total latency associated with processing the instruction (e.g. total latency from dispatch to retirement).

However, when the address translation latency is being measured, then another option is to filter based on the address translation latency itself. For example, a given threshold may be set and the translation latency measuring circuitry may write the measured latency (and possibly the other data monitored for the same instruction) to the storage location when the measured latency is greater than the threshold value. Hence, for instructions for which the address translation latency is less than the threshold value (which have not generally encountered as significant performance issues), writing of the performance data can be suppressed to conserve space in the storage location.

FIG. 1 shows an example of a processing pipeline 10 for performing data processing in response to instructions. The pipeline 10 includes a decode stage 100 for decoding received instructions, and an issue stage 102 for issuing the decoded instructions to the execute stage 104. The execute stage 104 can include a number of execute units for carrying out different types of processing operations. Operands for instructions executed by the execute stage 104 are read from registers 105. Results of the instructions are written back to the registers 105 at a writeback stage 106. It will be appreciated that the particular arrangement of pipeline stages shown in FIG. 1 is just one example, and other types of stages could also be provided, such as a dispatch stage provided between decode and issue, or a register renaming stage for mapping architectural register specifiers specified by instructions to physical registers 105 provided in hardware. It will be appreciated that the processing pipeline 10 could be an in-order pipeline, or an out-of-order pipeline, and the processing pipeline 10 may process multiple instructions in parallel (e.g. by providing dual-issue of instructions from a common program thread, or by supporting execution of multiple threads in parallel).

A memory system 118 is provided for storing data. In this example, the memory system 118 includes a data cache 120 and memory 122, but it will be appreciated that further levels of cache could be provided. When an instruction requires access to data in a memory, a virtual address of that data is obtained at the execute stage 104. The execute stage 104 refers to the address translation circuitry 114 which translates the virtual address to obtain a physical address for accessing data in the memory system 118. The address translation circuitry may store the mapping between the virtual address and the physical address locally in a translation lookaside buffer (TLB) 116, in which case the physical address can be returned relatively quickly. When the required mapping is not stored in the TLB 116, the address translation circuitry 114 refers to page tables stored in the memory system 118 to obtain the required translation data. Accesses to the data cache 122 and the system memory 120 typically require more processing cycles than accesses to the TLB 116.

The processing pipeline 10 of FIG. 1 also includes performance monitoring circuitry 110 which can measure and record statistics relating to the instructions processed by the processing pipeline 10. The performance monitoring circuitry 110 can record metrics relating to processing of the instructions at any stage of the pipeline. In this example, the performance monitoring circuitry 110 includes translation latency measuring circuitry 112 for measuring the latency of address translations performed in response to certain instructions.

One approach to performance monitoring may be to count the number of discrete events which occur during processing of a stream of instructions by the pipeline, e.g. counting the number of cache misses, TLB hits, etc. However, while the number of events encountered during processing of the program as a whole can give some indication of whether performance is good or poor, events by themselves do not give much information about the reasons for potential loss of performance. To improve code performance, it can be more useful to provide information about where the performance problem arises, such as identifying which instruction, line of code, class or module had the performance issue, and identifying the call stack and/or path to that instruction, or identifying which data, variable, array or object was being processed when the performance issue was encountered. Therefore, the performance monitoring circuitry 110 may record events or diagnostic information detected for processing of a particular instruction (in some embodiments information could still be gathered for the program as a whole in addition to the information detected for a particular instruction). However, tracking such instruction-by-instruction information for all processed instructions would be expensive in terms of the area and power cost of the monitoring circuitry 110 and storage capacity for storing the gathered performance information.

This cost can be reduced by sampling the instructions to reduce the number of instructions for which performance monitoring information is gathered. The processing pipeline 10 also includes instruction selecting circuitry 108. The instruction selecting circuitry can be configured to indicate a specific group of instructions for which the performance is to be monitored (e.g. by appending a tag to selected instructions passed down the pipeline, or storing a separate record of which instructions were selected). Other instructions that have not been indicated by the instruction selecting circuitry 108 are not monitored. When one of the instructions that has been indicated by the instruction selecting circuitry requires an address translation, the translation latency measuring circuitry 112 measures the latency of the translation. By cutting down the cost of performance profiling to a more manageable level, instruction sampling has other advantages in that it makes feasible more complex measurements for a particular instruction, such as those relying on correlation of different events for the same instruction (e.g. detecting total latency between dispatch/issue and retirement for a load, or detecting correlation between TLB and cache misses), or detecting the number of instructions retired under the monitored instruction in an out-of-order processor. Also, this approach allows more precise attribution of performance data to a particular instruction, e.g. associating performance information with the program counter of a given instruction or the virtual address of a data value being accessed.

In one implementation, the instruction selecting circuitry 108 includes a counter, and software writes a sampling interval to the counter. The interval may be measured in decoded instructions, or could be measured in number of processing cycles elapsed or time elapsed. When sampling is enabled, the counter is decremented for each decoded instruction or processing cycle, or following the elapse of a given period of time. When the counter reaches zero an instruction is then chosen for profiling (alternatively, the counter could be initialised at zero and count upwards towards a given threshold for triggering selection of an instruction for profiling). Optionally, a random perturbation may be enabled, in which case the counter may continue to count for a random further period (e.g. a random number of further decoded instructions), and then an instruction is chosen for profiling. The random perturbation reduces the chance of a sampling bias occurring. For example, if the sampling interval coincides with a program loop, or a combination of program loops, the sampled instructions may become repetitive, and may not provide a statistically diverse view of the performance achieved for the program as a whole. Note that, at the point when the sampling interval or the random further period expires, the choice of which instruction to select around the sampling point may be arbitrary, so long as the choice is consistent so as not to introduce a sampling bias. For example, the chosen instruction may be the instruction for which the sampling interval elapsed, or the following instruction. Once an instruction is chosen, the counter can be reset, and the process repeated. The chosen instruction is then tracked within the pipeline 10 by the performance monitoring circuitry 110, and a sample record is captured for that instruction. It will be appreciated that in the example of FIG. 1, instructions are chosen for profiling at the decode stage. However, different microarchitectures may choose different points to decide when to sample instructions.

The maximum number of instructions that can be simultaneously chosen for sampling in flight can vary, but in some implementations this is only one instruction at a time. If the maximum number of samples is still in flight at the point when the sampling interval expires, selecting a new sample would cause a collision with the previous sample, and so the instruction selecting circuitry 108 does not select a new sample, resets the sampling counter and waits until the next time the sampling interval expires before selecting another sampled instruction. In response to a collision, the instruction selecting circuitry may increment a collision counter that records the number of collisions (if a significant number of collisions occur then this may indicate that either the sampling interval is too short or the sampled instructions are encountering significant performance issues).

In some systems, there may be a one-to-one mapping between the instructions received for decoding at the decode stage 100 and the instructions processed by later stages. However, in other examples, the "instructions" as seen by later stages 102, 104, 106 of the pipeline 10 may not be in the same form as the instructions fetched from an instruction cache or memory which are provided to the decode stage 100. The macro-instructions fetched may have an encoding according to a given instruction set architecture, but the decode stage 100 may map these instructions to micro-operations (μ-ops) to be processed by the execute stage 104. For example, a load multiple instruction, which loads multiple register locations with different values, could be mapped to multiple μ-ops, each for loading a register with a value, and each of these μ-ops may require a separate address translation. Similarly, there may be other complex instructions defined in the architecture which could be mapped to simpler μ-ops by the decode stage 100. Also, the decode stage may fuse two architectural instructions into one μ-op supported by the execute stage 104. e.g. a multiply instruction followed by an addition using the result of the multiply could be replaced with a multiply-add μ-op if such an operation is supported by the execute stage 104. Hence, the sampling interval used by the instruction selecting circuitry 108 could in some cases be counted in terms of the number of macro-instructions received for decoding, while in other cases the sampling interval could be counted in terms of the number of μ-ops generated by the decode stage. The subsequent performance monitoring at later stages may be based on μ-ops. In general, the term "instruction" referred to below may be considered to cover either macro-instructions or μ-ops.

Figure 2:
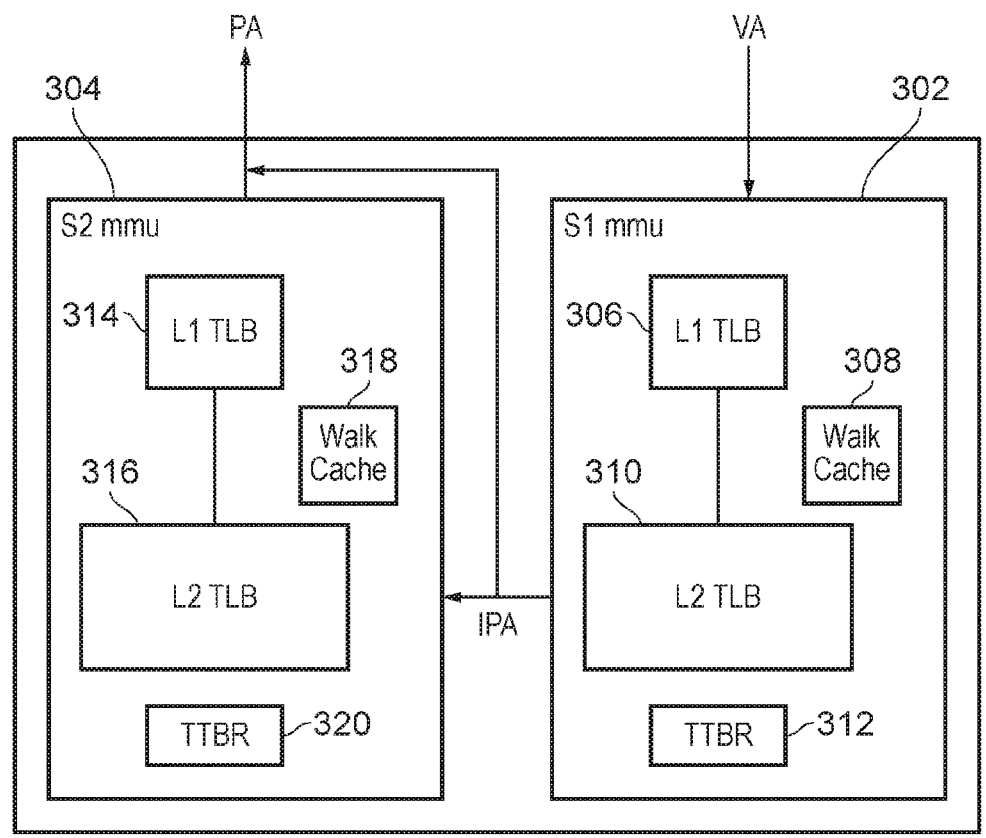
FIG. 2 schematically illustrates one example of address translation circuitry having two MMUs.

FIG. 2 shows an example of the address translation circuitry 114 that is configured to perform a two stage address translation. Some systems support software operating at different privilege levels. For example, a virtualised apparatus may be running a hypervisor which operates at a higher privilege level, and one or more operating systems running at a lower privilege level, and each operating system may control applications running at an even lower privilege level. The applications and operating systems may use virtual addresses (VAs) to identify locations to be accessed in the memory system 118, which are first translated into intermediate physical addresses (IPAs) at a first stage of address translation, and then the IPAs are translated into physical addresses at a second stage. By providing two levels of address translation, the operating system may control page tables for the stage 1 (VA to IPA) translation to control which portions of the address space are allocated to itself and each application 6, and the hypervisor may control page tables for the stage 2 (IPA to PA) translation to control which portions of the physical address space are allocated to each operating system. Data accesses initiated by the hypervisor would specify VAs and only require the stage 1 translation, as the IPAs generated by the stage 1 translation may be identical to corresponding physical addresses for accessing the memory system 118.

Hence, the address translation circuitry includes two memory management units (MMU), a Stage 1 (S1) MMU 302 and a Stage 2 (S2) MMU 304. The S1 MMU 302 is configured to translate virtual addresses (VAs) into intermediate physical addresses (IPAs), and the S2 MMU 304 is configured to translate the IPAs into physical addresses (PAs). The S1 MMU 302 has a level 1 TLB 306, a level 2 TLB 310, and a walk cache 308. The TLBs can cache page table entries for a number of recently accessed pages of the virtual address space. Each page table entry may include a virtual-to-intermediate address mapping and optionally may also include information defining whether read/write access is permitted for certain software processes. When the required address mapping for a given virtual address is not in one of the TLBs 306, 310, a page table walk may be performed to fetch the required translation data from page tables stored in the memory system 118. In some cases, the required address translation data could be cached in the data cache 122, but if not then the data can be fetched from main memory 120. The walk cache 308 may cache the addresses of the locations in the memory system 118 at which the translation data is stored (as opposed to caching the translation data itself). The S1 MMU 302 also includes a translation table base register (TTBR) 312 for indicating an intermediate physical address identifying the location of the stage 1 page tables in the memory system 118. The S2 MMU 304 is similar to the S1 MMU 302, except it is configured to translate intermediate physical addresses into physical addresses, and the TTBR 320 of the S2 MMU 304 specifies a physical address identifying the stage 2 page tables. While FIG. 2 shows an example where each MMU has two levels of TLB, other examples could provide just a single level of TLB or more than two levels, and in some cases the S2 MMU 304 may have different numbers of TLB levels.

While FIG. 2 shows an example with two separate MMUs 302, 304 provided in hardware, in other embodiments a single circuit could implement both functions. For example, TLBs and/or walk caches could be shared and entries could be tagged to indicate whether they relate to the stage 1 or stage 2 translation. Two separate TTBRs 312 would still be provided.

Other embodiments may only have a single stage of address translation, in which case a single MMU 302 may be provided for translating virtual addresses to physical addresses. Also, other embodiments might have more than two stages of address translation.

Figure 3:
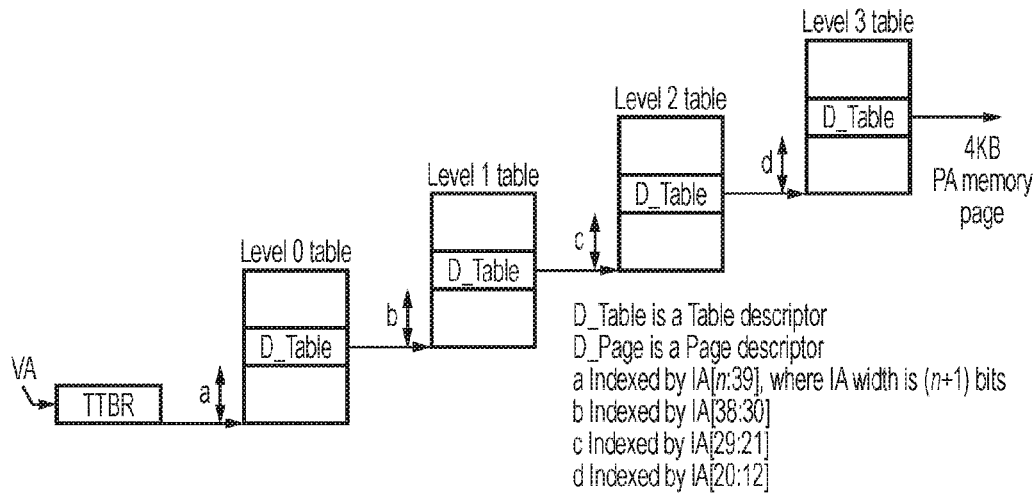
FIG. 3 shows an example of a multilevel page table walk.

FIG. 3 illustrates one example of performing a page table walk for a single stage of the address translation when none of the TLBs stores the required translation data for translating a given address. In this example, the page tables have a hierarchical structure where several levels of page table are provided. Different portions of bits from the input virtual address are used to index into each level of the page table structure. In this example, addresses have n+1 bits (i.e. bit [n] is the most significant address bit—n could be fixed or configured by software), and the level 0, 1, 2 and 3 tables are indexed using "a" bits [n:39], "b" bits [38:30], "c" bits [29:21] and "d" bits [20:12] respectively (it will be appreciated that the exact subsets of bits used to index into each level of the page table may be different in other examples—this will depend on the size of the address ranges represented by the entries in that level and the number of entries provided in each level). In the page table walk, first the TTBR 312 is read to identify the base address of the level 0 table. The "a" bits of the virtual address indicate the location in the level 0 table where a table descriptor including a pointer to the base address of the next table, the level 1 table, is stored. Therefore, one memory access is made to retrieve the table descriptor stored in the level 0 table. This table descriptor indicates the location of the next table, the level 1 table, and the "b"-bits of the virtual address are then used to locate the next table descriptor which identifies the base address of the level 2 table. This process is repeated for each further level of page table, and the final level table (level 3 in this example) includes the page table entry providing the actual translation data for translating addresses in the required page, and the obtained page table entry is returned and cached in the L1 TLB 306 so that a subsequent access to an address in the same page can be handled more quickly. Hence, in the example of FIG. 3, four memory accesses are required before a page table entry is returned. In this example, the page size (block of addresses associated with one page table entry) is 4 KB, but it will be appreciated that other page sizes could be used.

In systems using hierarchical page table structures such as the one shown in FIG. 3, performing the complete page table walk can be slow because several memory accesses may be required. There are various caching and storage structures that can be used to speed up page table walks. Often, recently accessed page table entries are stored in a TLB. In such cases, the virtual address may be translated without performing a page table walk at all. In other cases, some or all of the table descriptor data accessed at levels of the page table walk other than the final level could be stored locally in the walk cache 308. By storing addresses of some levels of the page table walk in the walk cache, a subsequent page table walk to a nearby region in the address space can be performed faster by eliminating at least one of the memory accesses for traversing the hierarchical structure. For example, the level 2 table descriptor identifying the address of the page table entry in the final level 3 table could be cached in the walk cache so that next time only one memory access to the level 3 table is required to access the same page table entry. Another way of speeding up page table walks is to store some page table entries or portions of the page tables in the data cache 122 to allow faster access than if it had to be read from main memory 120. Depending on the current caching policy, the time taken to retrieve page table entries for two virtual addresses that miss in the TLBs can vary to a significant extent depending on where the table or page descriptor data is stored.

Figure 4:
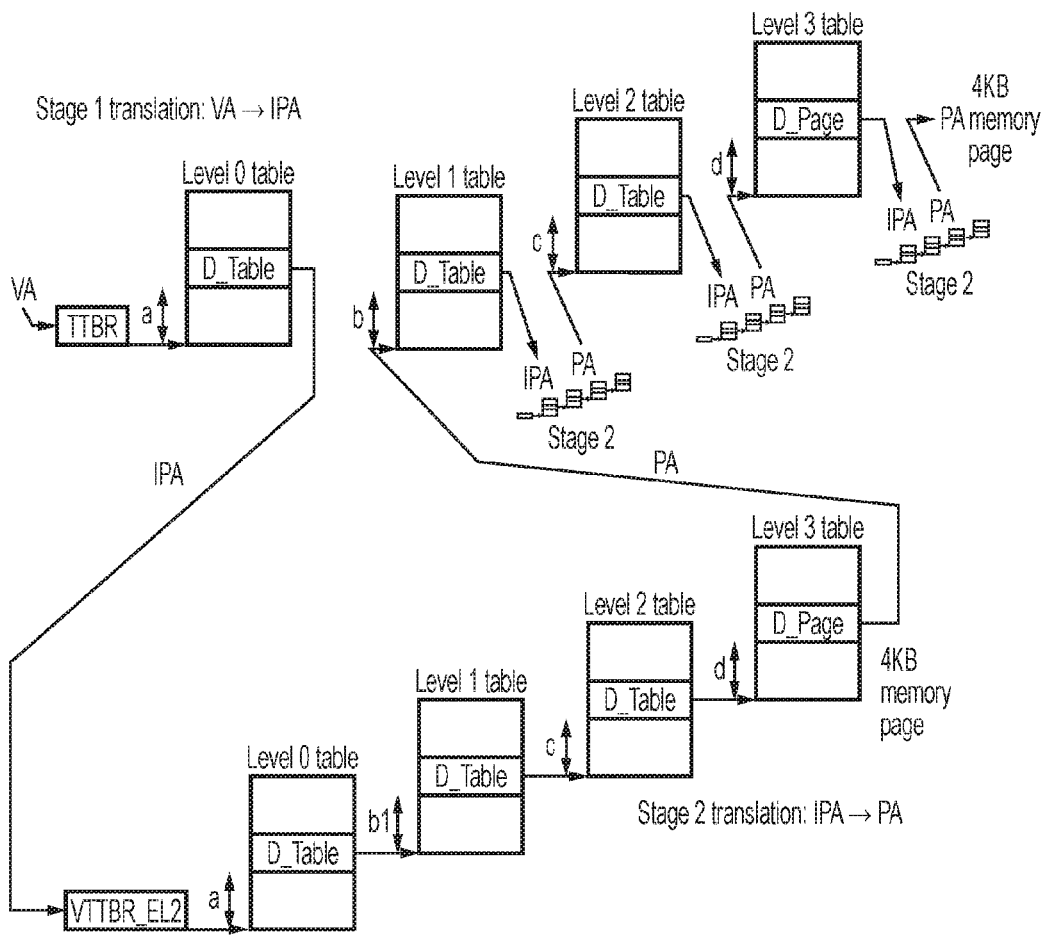
FIG. 4 shows an example of a multilevel page table walk where there are two stages of address translation.

In systems with two stages of address translation as discussed above, this variation in latency can be exacerbated because, as shown in FIG. 4, each time a table descriptor (providing the base address of the next level page table) is obtained as part of the stage 1 address translation, the descriptor is only in the form of an intermediate physical address. In order to access the next level table, this intermediate physical address needs to be translated into a physical address, requiring a stage 2 translation. If the required IPA hits in the S2 L1 or L2 TLB 314, 316 then the stage 2 translation may be relatively fast. However, in the worst case an additional S2 page table walk may need to be performed each time another table descriptor is obtained in the S1 page table walk. If there are N levels of page table used in each stage, then the number of memory accesses required to locate the final address translation data for translating the original VA to a corresponding IPA grows with the square of N. This exacerbates the possible variations in the time taken to perform page table walks for different address translations.

As there are many permutations of what data may and may not be readily available to the address translation circuitry, a discrete indication of whether or not an address translation was stored in a TLB does not indicate the impact of the TLB miss on performance. A large number of TLB misses may be acceptable if a majority of the time the walk cache 308 or data cache 122 could be used to avoid the full penalty of the worst case page table walk. On the other hand, a report indicating that there have only been a small number of TLB misses may suggest that the data processing apparatus is running efficiently. However, if these misses all required full page table walks such as the one shown in FIG. 4, the mere indication of the number of misses does reflect the full extent of the cost to performance.

Figure 5:
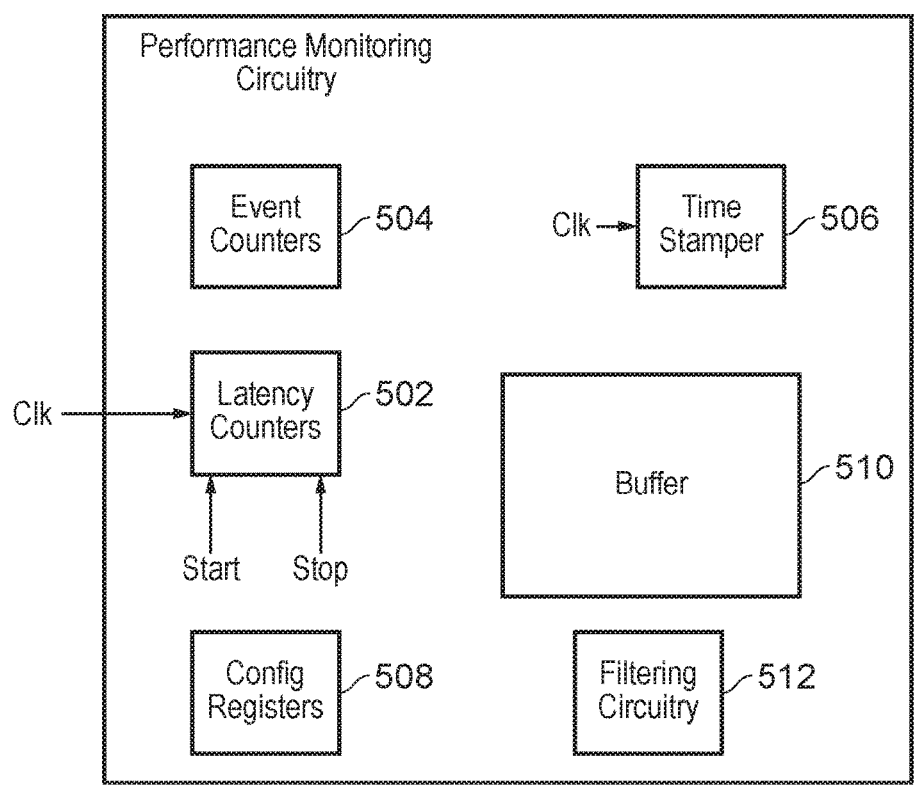
FIG. 5 schematically illustrates one example of performance monitoring circuitry.

FIG. 5 shows one example of the performance monitoring circuitry 110. The performance monitoring circuitry 110 includes latency counters 502, event counters 504, a time stamper 506, configuration registers 508 and a buffer 510. The latency counters 502 and the time stamper 506 provide alternative ways of measuring latencies, either of which may correspond to the translation latency measuring circuitry 112 of FIG. 1. Either the latency counters 502 can incremented between a start event and an end event, or the timings of the start event and the end event can be recorded by the time stamper 506.

The buffer 510 is used to store recorded address translation latencies, as well as other performance indicators relating to other types of instructions. For example, the buffer 510 may also be used to store:
  Timestamps relating to the sampled instruction;
  The context, privilege level and security state from which the instruction was issued;
  Whether the instruction generated an exception;
  Whether the instruction completed execution;
  The program counter virtual address for the instruction;
  Whether the instruction is a branch, a load, a store, or other;
  Whether the instruction is a conditional, conditional select, or not;
  The total latency, that is a cycle count from the instruction being dispatched for issue to the instruction being complete;
  The issue latency, that is a cycle count from the instruction being dispatched for issue to the μ-ops being issued;
  Records for other events, latency counters and/or addresses For load, store or atomic instructions, the buffer 510 may also record:
  The virtual and physical address being accessed.
  The instruction type.
  The address translation latency.
  Whether a request for translation data hit in a TLB.
  Whether the data access hit in a first level cache.
  Whether the data access hit in any other level caches.
  Whether the access accessed another socket in a multi-socket system.
  An indicator of the data source for a load.

Other instructions which could have the address translation latency recorded may include cache maintenance instructions for invalidating or cleaning data from the data cache 122 corresponding to a specified virtual address or block of virtual addresses, or any other kind of instruction requiring a virtual address to be translated.

A packetized format may be used to write the data associated with a given instruction to the buffer 510. For example, different packet headers may be used to identify what type of performance monitoring information is included in each packet. In some examples, all performance information could be stored on-chip in buffer 510, and read out by executing instructions to read the buffer, or an interface could be provided for accessing the buffer from an external device. However, this can require a relatively large buffer which may be expensive in terms of hardware, and the size of buffer that could feasibly be included would still only allow a relatively small number of samples to be collected. Therefore, another approach can be to provide a buffer 510 on-chip to temporarily store a small amount of monitoring data as it is captured, and when the buffer 510 becomes full, to trigger an exception which causes the data to be read from the buffer 510 and written out to the memory system 118 so that the buffer 510 can be overwritten as more data is captured by the performance monitoring circuitry 110. This allows many samples to be collected.

The configuration registers 508 can include control bits to dictate which of the above events are to be recorded. The configuration registers 508 may be programmably set by software, or could be hardwired during manufacture of the apparatus.

The performance monitoring circuitry 500 also includes filtering circuitry 512 configured to filter recorded data. Collected samples may be filtered based on instruction type. For example, records may only be stored for load instructions, whereas any data collected from other instructions, including branches or store instructions, may not be stored. Alternatively, filtering can be based on an event or combination of events, such as mispredicted branches, the TLB missing accesses, level 1 cache refilling accesses, and/or retired instructions. The configuration registers 508 may specify how filtering is to be performed. In one example, the filtering circuitry 512 performs filtering is based on latency, so that only records having a total latency (e.g. from dispatch to retirement) greater than a given threshold, or only records having an address translation latency that is greater than a programmable threshold value are stored. When the filtering circuitry 512 determines that data corresponding to a sampled instruction is meets the filtering requirements, the data may be stored in the buffer 510, and then written out to the memory system. Alternatively, all data corresponding to sampled instructions may be initially written to the buffer regardless of whether the filter criterion is satisfied, but subsequently the filtering circuitry 512 may filter the data stored in the buffer prior to writing it to the system memory.

Figure 6:
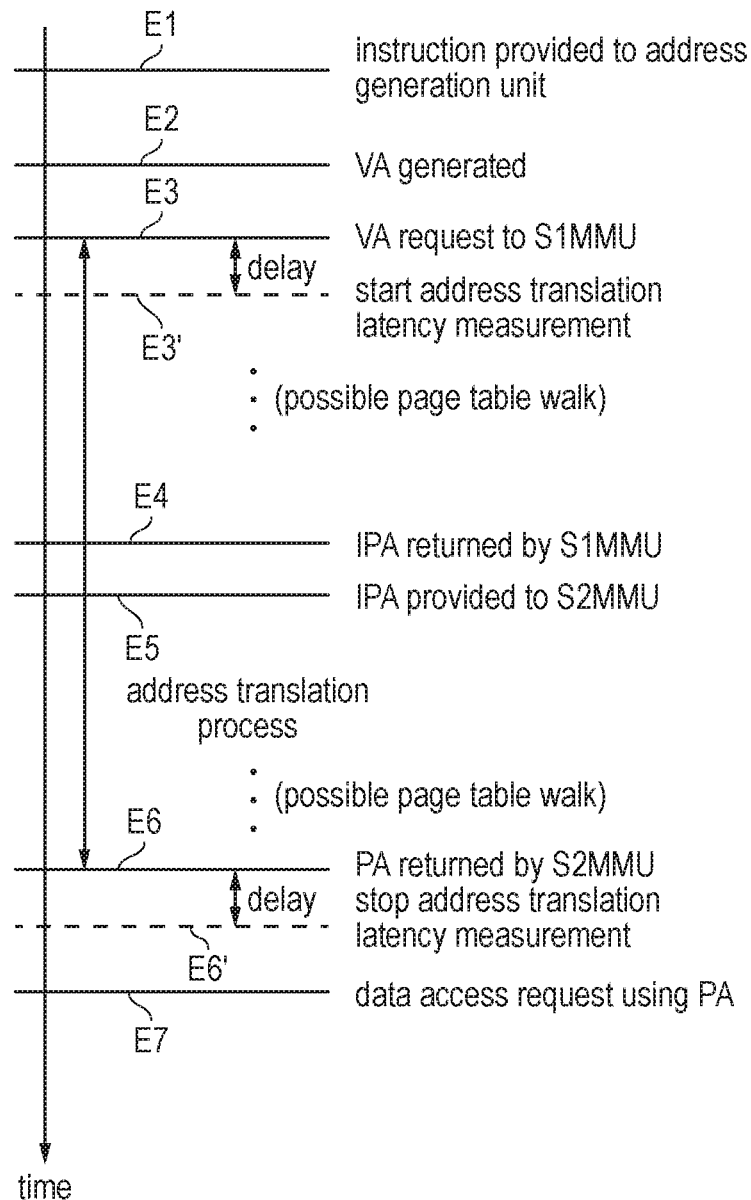
FIG. 6 shows one example of different start events and end events that may be considered when measuring the latency of an address translation process.

FIG. 6 shows an example of the different events associated with the address translation process, including:

E1: an instruction is provided to an address generation unit in the execute stage 104 for generating the required virtual address (in some cases the address generation unit may be a dedicated functional unit for generating addresses, or alternatively the address generation unit may simply be some circuitry (e.g. an arithmetic/logic unit) already provided for handling other tasks which can also generate addresses (e.g. by adding a base address to an offset)), E2: the virtual address is generated by the address generation unit, E3: a virtual address request is sent to the S1 MMU, E4: an intermediate physical address is returned by the S1 MMU, E5: the intermediate physical address is provided to the S2 MMU (note that in some cases E4 and E5 may be essentially the same event), E6: a physical address is returned by the S2 MMU, and E7: a data access request using the obtained physical address is issued to the memory system 118.

As shown in FIG. 6, the address translation process may correspond to the actions performed between the virtual address request being sent to the MMU at E3 and the physical address being returned at E6. Hence, in some cases the address translation latency may be measured between a start event E3 and an end event E6. The time between these events is dependent on factors such whether translation data is stored in a TLB, whether the addresses of page table entries are cached in a walk cache, or whether page table entries are cached in a data cache in memory, and can vary to a relatively large extent in response to different instructions. As such, it is advantageous to measure the address translation latency between E3 and E6 to provide useful information for diagnosing the reasons for observed loss of performance.

However, in other cases the start event for measuring the address translation latency could be earlier than the virtual address request being issued at E3. For example, while the delay between E3 and E6 may vary from translation to translation, the delay between E1 and E3, or between E2 and E3, may be relatively constant for each translation, for example if there is no queueing of instructions between the time E1 when the instruction is provided to the address generation unit and the time E3 when the virtual address request is sent to the MMU. Therefore, other examples may use E1 or E2 as the start event from which the latency is measured. Even though the period between E1 and E3 may not actually be part of the address translation process, starting counting at E1 or E2 may in some cases be more convenient to implement in circuitry, and if the time between E1 and E3 is unlikely to vary significantly from instruction to instruction, this will still provide a measure of the relative delay caused by address translation for a given instruction.

Similarly, the end event for measuring address translation latency does not have to be the return of the physical address at E6. Instead, the end event could be when the data access request is issued at E7.

Also, note that the measurement does not have to begin at E3. Instead, a delay may be included before the measurement begins at a later time E3'. This can be useful for allowing any performance critical processes that may be slowed by beginning the measurement to be initiated first. As long as the delay between E3 and E3' is constant across a number of measurements (e.g. because it depends on the delay for a signal to propagate through a certain set of logic gates), starting counting the latency late at E3' would merely result in a fixed skew to the absolute latency values recorded, without affecting the relative latencies measured for different translations which can be of more interest than the absolute latency. Similarly, a delay may be included after E6 before measurement is stopped at E6'.

It will be appreciated that FIG. 6 is one example of events that may be used during the measurement of an address translation process, and there are other events that may be used instead. In general, any start or end events can be used which allow a value representative of the latency of at least part of the address translation process to be recorded.

FIG. 6 shows an example with a two-stage address translation process, and in this case it would also be possible to record the latency between events E3 and E4 (corresponding to the latency of the stage 1 translation), or between events E5 and E6 (corresponding to the latency of the stage 2 translation), either as the sole latency measurement or in combination with also measuring the total latency between E1/E2/E3 and E6/E7. In other examples, the address translation process may include a single stage virtual to physical address translation.

Although not shown in FIG. 6, a page table walk may be required between events E3 and E4 for the stage 1 translation, or between events E5 and E6 for the stage 2 translation. In this case, another option may be to have the start event being the initiation of a page table walk (e.g. the detection of a TLB miss or the issuing of a page table entry request to memory), and the end event being the completion of the page table walk (e.g. the return of the required page table entry from the memory system). Hence, the latency could also be measured as a latency associated with just part of the address translation process (e.g. the page table walk).

Figure 7:
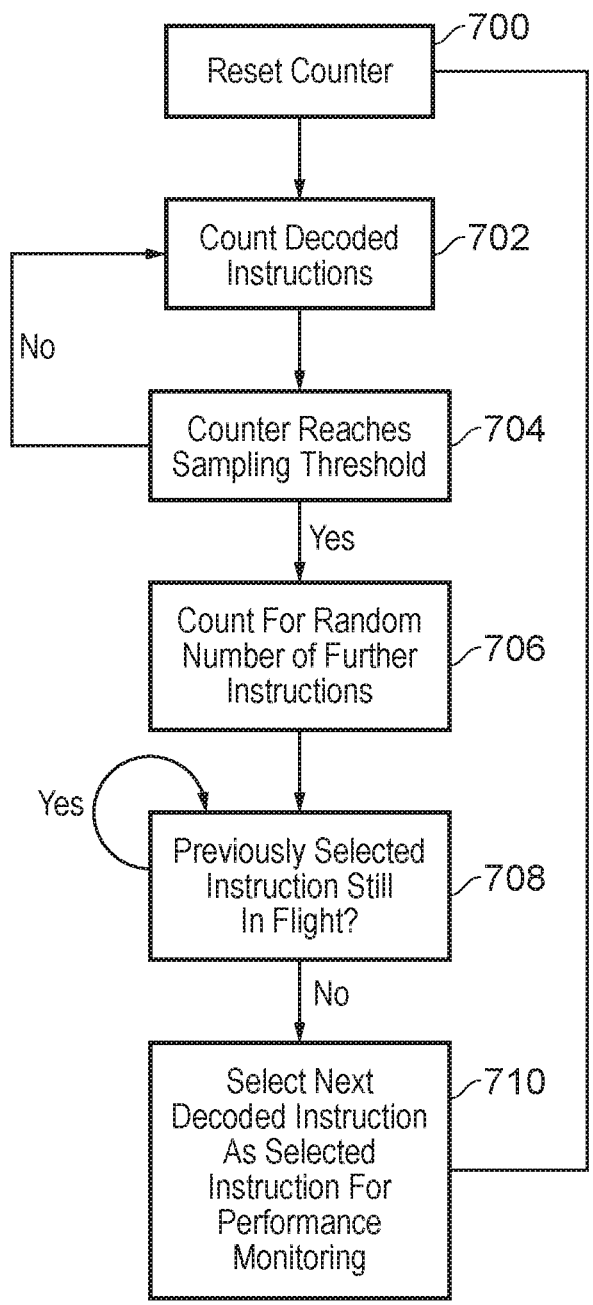
FIG. 7 shows a method for sampling instructions.

FIG. 7 illustrates a method for sampling instructions. At step 700, the counter is reset. The process then moves on to step 702 where the process counts decoded instructions. At step 704, it is checked whether the counter has reached a sampling threshold. If not, the counter returns to counting decoded instructions. On the other hand, if the counter has reached a sampling threshold, then the process moves on to step 706, where the counter increments or decrements for a further random number of instructions. This is to prevent the sampling cycle from becoming repetitive, leading to a less diverse population of samples. Then, at step 708 it is checked whether the previously selected instruction is still in flight (e.g. whether the previously selected instruction has reached the write back stage). If the previously selected instruction is no longer in flight, then the next decoded instruction is selected as an instruction for performance monitoring at step 710. The process then returns to step 700. This method may be implemented by the instruction selecting circuitry 108 of FIG. 1 for example. As discussed above, instead of counting decoded macro-instructions, the counter could also count the number of generated micro-operations. Also, other examples may count sampling intervals defined in terms of time or number of cycles instead of the number of instructions. Also, the counter could count up to a given threshold or down to zero from a certain start value.

Figure 8:
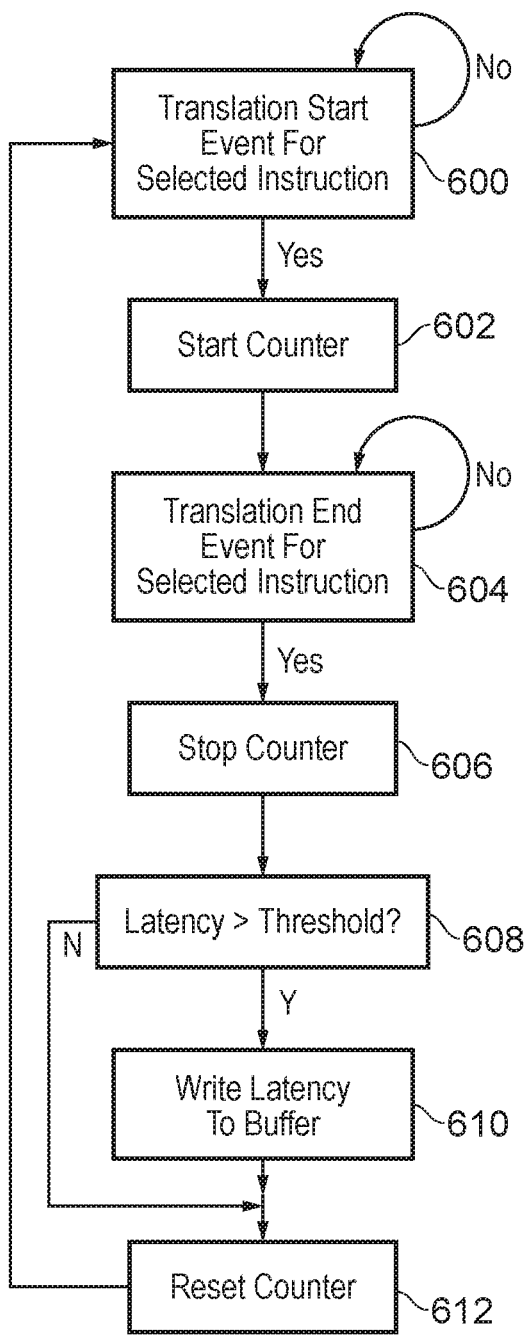
FIG. 8 shows a method for measuring the latency of an address translation.

FIG. 8 illustrates a method for performing a translation latency measurement. At step 600, the translation latency measuring circuitry 112 monitors whether or not a start event for a selected instruction has occurred. When a start event does occur, the process moves to step 602 where a counter is started in response to the start event. The counter may be started immediately following the start event, or a fixed delay may occur before starting the counter as discussed above for FIG. 6. In step 604, the translation latency measuring circuitry 112 monitors whether or not an end event for the selected instruction occurs. When an end event occurs, the process moves on to step 606 and stops the counter. An optional step 608 may be included where the latency is compared to a threshold value, and if the latency is greater than the threshold value, then the latency is written to a buffer in step 610. Alternatively, the latency could be written to the buffer 510 regardless of the latency, but prevented from being written to memory if it is less than the threshold value. In step 612, the process resets the counter and returns to step 600.

The address translation latencies measured for a number of sampled instructions can also be used to derive other information which could be useful for analysing performance of execution of a given program. For example, parameters such as the minimum latency, maximum latency or average latency can be determined. Although it would be possible to derive such additional information on-chip, in practice it may be simpler to do this externally once the captured latency values have been read out from the buffer 510 or the memory system 118. While it is possible that some of the instructions that were not sampled may encounter latencies greater than the determined maximum or less than the determined minimum, if a statistically valid sample population is selected then the minimum/maximum determined based on the sampled instructions only may still provide a reasonable estimate of the minimum/maximum latency across the program as a whole. Similarly, with a statistically valid sample population, the average latency determined by averaging over the sampled latencies may provide a reasonable estimate of the actual average if all translations had their latency measured.

It is also possible to estimate the average queue depth (average number of outstanding translations pending at the address translation circuitry 114 at a given time) using the measured latencies and a count of the total number of translations made over a given period. Little's Law states that the long-term average number of customers in a stable system L is equal to the long-term average effective arrival rate, $\lambda$, multiplied by the average time a customer spends in the system, W; $L=\lambda W$. A translation counter may be provided (either in the performance monitoring circuitry 110 or in the address translation circuitry 114 (MMU) itself) to count the total number of translations T made in a given number of cycles N. The long-term average effective arrival rate $\lambda$ can be determined as T/N, and so the average queue depth L may then be calculated as TW/N, where W is the average translation latency determined using the measured translation latencies as discussed above.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An apparatus comprising:
processing circuitry to process instructions;
address translation circuitry to translate a virtual address to a physical address in response to a virtual address request from the processing circuitry; and
translation latency measuring circuitry to measure a latency of at least part of an address translation process performed by the address translation circuitry in response to a given instruction, wherein said translation measuring circuitry is configured to exclude from the measured latency: a latency of a data access operation using the physical address obtained as a result of translating the virtual address specified in the virtual address request.

2. The apparatus according to claim 1, wherein the address translation process comprises a first translation stage for translating the virtual address to an intermediate address, and a second translation stage for translating the intermediate address to the physical address.

3. The apparatus according to claim 2, wherein said latency comprises a total latency of both said first translation stage and said second translation stage.

4. The apparatus according to claim 2, wherein said latency comprises a latency of a selected one of said first translation stage and said second translation stage.

5. The apparatus according to claim 1, wherein the address translation circuitry is configured to obtain translation data for translating a given address from a memory by performing a page table walk using a plurality of levels of page table stored in the memory.

6. The apparatus according to claim 1, comprising instruction selecting circuitry to select a subset of instructions processed by the processing circuitry;
wherein the translation latency measuring circuitry is configured to measure said latency when one of said subset of instructions requires the address translation process.

7. The apparatus according to claim 6, wherein the translation latency measuring circuitry is configured to identify whether a given instruction is one of said subset of instructions based on at least one of:
a tag value associated with the given instruction indicating whether or not the given instruction is one of said subset; and
an identifier stored separately from the given instruction identifying that the given instruction is one of said subset of instructions.

8. The apparatus according to claim 6, wherein the instruction selecting circuitry is configured to determine whether a predetermined interval has elapsed since selecting a previous instruction as one of said subset, and to select another instruction as one of said subset following elapse of the predetermined interval.

9. The apparatus according to claim 8, wherein in response to the predetermined interval having elapsed, when the previous instruction selected as one of said subset is still to progress beyond a predetermined stage of processing, the instruction selecting circuitry is configured to defer selecting another instruction as one of said subset until the previous instruction has progressed beyond said predetermined stage.

10. The apparatus according to claim 6, comprising performance monitoring circuitry to monitor at least one item of further information associated with processing of the subset of instructions other than said latency measured by the translation latency measuring circuitry.

11. The apparatus according to claim 10, wherein the at least one item of further information comprises at least one of:
an address of the given instruction;
a context identifier identifying a context associated with the given instruction;
an instruction type of the given instruction;
an address to be translated in response to the given instruction;
a translated address obtained in response to the given instruction;
a total latency associated with processing of the given instruction;
an indication of whether an address request for the given instruction hits in a translation lookaside buffer; and
an indication of whether a data request for the given instruction hits in a data cache.

12. The apparatus according to claim 1, wherein the translation latency measuring circuitry is configured to measure the latency between a start event and an end event detected for said given instruction.

13. The apparatus according to claim 12, wherein the translation latency measuring circuitry is configured to detect the start event in response to a request for an address translation being received by the address translation circuitry for said given instruction.

14. The apparatus according to claim 12, wherein the translation latency measuring circuitry is configured to detect the start event in response to the given instruction being issued to a functional circuit unit configured to issue requests for address translation to the address translation circuitry.

15. The apparatus according to claim 12, wherein the translation latency measuring circuitry is configured to detect the end event in response to a translated address being returned by the address translation circuitry.

16. The apparatus according to claim 12, wherein the translation latency measuring circuitry is configured to detect the end event in response to a data access request specifying a translated address obtained by the address translation circuitry being issued to a data store.

17. The apparatus according to claim 12, comprising a counter to start counting the latency in response to the start event and stop counting the latency in response to the end event.

18. The apparatus according to claim 1, wherein the translation latency measuring circuitry is configured to write the measured latency to a storage location.

19. The apparatus according to claim 18, wherein the storage location comprises a performance monitoring buffer for storing data monitored during processing of the given instruction.

20. The apparatus according to claim 18, wherein the storage location comprises a region of memory.

21. The apparatus according to claim 18, wherein the translation latency measuring circuitry is configured to write the measured latency to the storage location when the measured latency is greater than a threshold value.

22. A data processing method comprising:
processing instructions;
translating a virtual address to a physical address in response to a virtual address request; and
measuring a latency of at least part of an address translation process performed in response to a given instruction, wherein said measuring excludes from the measured latency: a latency of a data access operation using the physical address obtained as a result of translating the virtual address specified in the virtual address request.

* * * * *